Aug. 12, 1930.   F. O. SNOW, JR   1,772,761
TRACKLAYING TRACTOR
Filed April 24, 1926    2 Sheets-Sheet 2
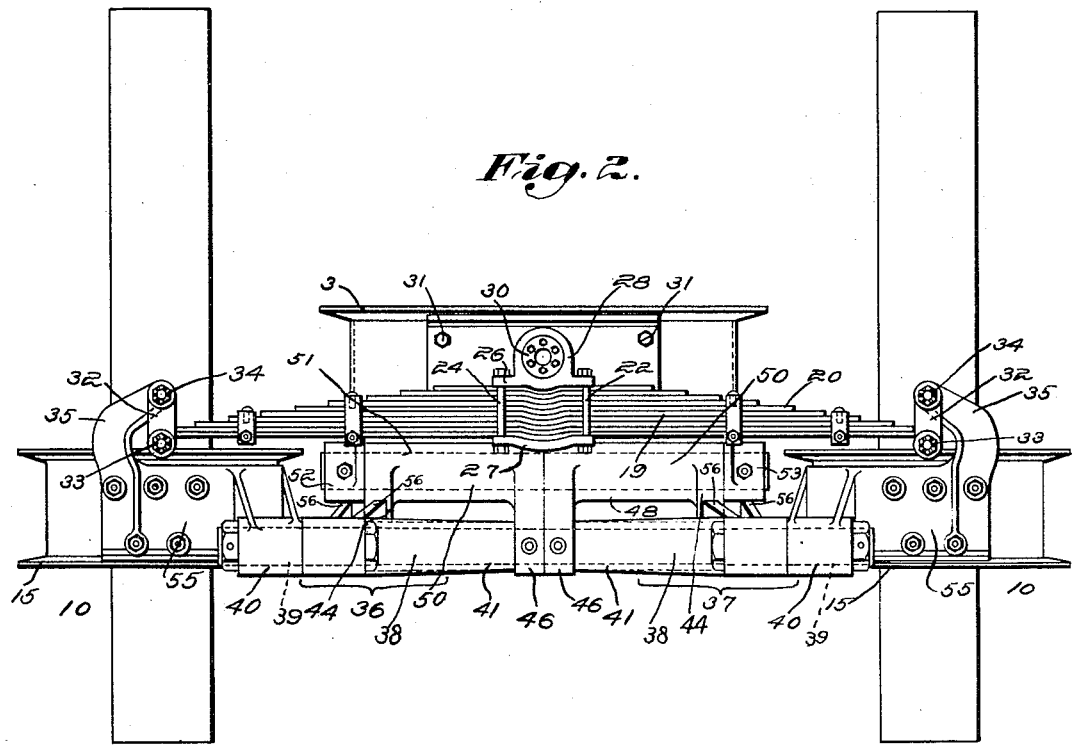
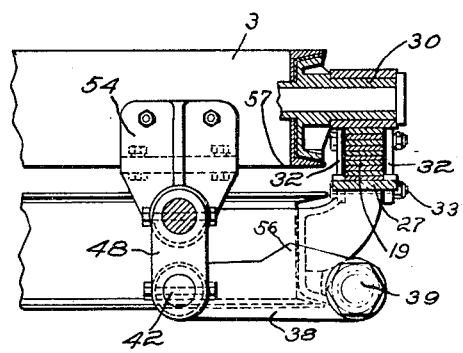

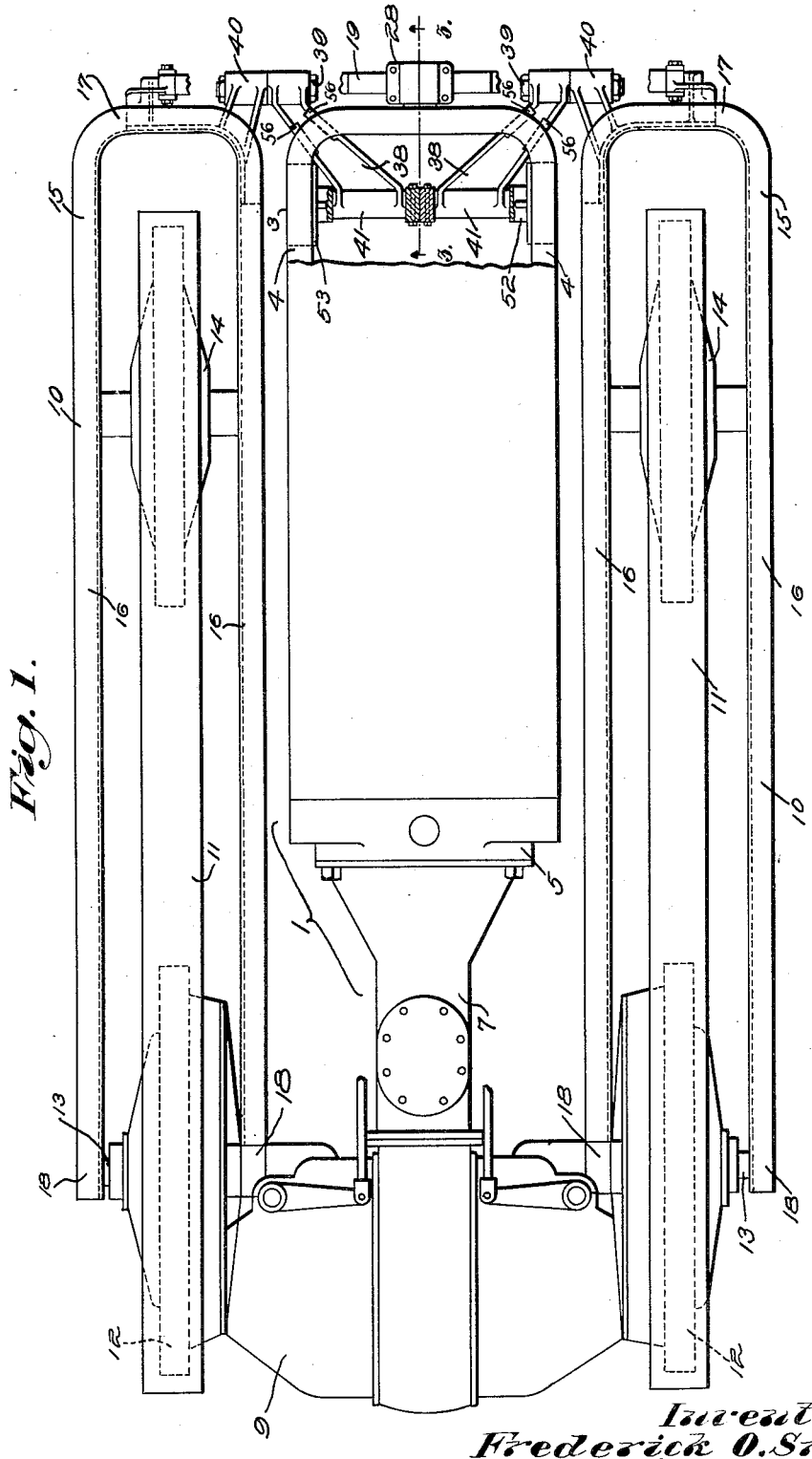

Patented Aug. 12, 1930

1,772,761

UNITED STATES PATENT OFFICE

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE

TRACKLAYING TRACTOR

Application filed April 24, 1926. Serial No. 104,330.

This invention aims to provide a strong flexible track-laying tractor and in the accompanying drawings I have shown merely for illustrative purposes one embodiment of my invention in which:

Fig. 1 is a general plan view of the tractor chassis with certain parts broken away and other parts removed to more clearly illustrate the invention;

Fig. 2 is a front elevation of the mechanism shown in Fig. 1; and

Fig. 3 is a detail vertical section taken on the line 3—3 of Fig. 1.

Referring more particularly to the drawings, 1 represents the main frame structure of the vehicle, which in the present example includes a U-shaped channel-like frame 3 upon which the motor for the tractor is mounted.

The closed end or base of this U-shaped frame is desirably arranged in the present example at the forward end of the vehicle while the side members 4 thereof extend rearwardly and support or are, as shown, secured to the rear portion of the main frame structure which in the present example includes a clutch housing 5, transmission housing 7 and rear axle housing 9. It is however to be understood that the invention is not limited to this construction.

Arranged at each side of the main frame structure is an endless track structure 10 each of which includes an endless track 11 supported at the rear end by a sprocket 12 rotatably mounted upon a suitable axle 13 carried by the rear axle housing 9. The forward end of said track chain is supported by and runs over an idler sprocket 14 rotatably mounted on an appropriate traction frame 15, said traction frame including parallel side members 16 desirably formed integral and in U-shaped arrangement with the closed end 17 of the U arranged at the forward end of the chassis. The rear extremities of the members 16 are herein pivotally mounted at 18 upon the axles 13 so as to allow said traction frames to swing about said shafts or axles in vertical planes parallel with the main frame structure, but it is distinctly to be understood that the invention is not limited to the swinging of said traction elements in vertical planes.

The endless track structures at each side of the main frame are further connected with said main frame structure near their forward ends by resilient means for the purpose of absorbing the vibrations and shocks produced from contact with or riding over irregularities in the surface of the ground along which the tractor is moving. Desirably this resilient supporting means is in the form of an equalizer spring 19 herein composed of a series of leaves 20 bound together centrally by shackle bolts 22 and 24 extending through upper and lower clamping plates 26 and 27 respectively, said upper plate carrying a bearing member 28. The bearing member 28 is pivotally mounted upon an appropriate bearing sleeve 30 secured to the forward end of the main frame structure 3 by bolts 31, said bearing member being free to turn on said support during the vertical relative movements of the endless track structures 10.

The equalizer member 19 is pivotally connected at opposite ends by shackles 32 of well known form, which are connected at their lower ends by bolts 33 to the ends of the equalizer member 19. The upper ends of said shackles are connected by bolts 34 with supporting lugs 35 carried by said traction frames 15 desirably secured to the forward ends 17 of said frames, all of said connections having sufficient play to allow free swinging movements of the traction frames relatively to said main frame.

By reason of the pivotal arrangement of said equalizing member the upward pivotal movement of one of said track structures 10 will produce a corresponding downward movement of the opposite track structure. In other words, the track structures will be able to accommodate themselves to the varying character of the road upon which they are traveling without disturbing the position or equilibrium of the main frame or body of the vehicle.

By connecting the ends of the springs with the traction frames by means of the links 32 the traction frames will be permitted to move in vertical parallel planes rather than in curved paths concentric with the axis of the equalizer member 19, but it is also desirable to provide means that will insure the movements of the free ends of said traction frames in said parallel planes.

To the above end means are provided to prevent lateral deviation of said track structures from the vertical parallel planes during said vertical swinging movements which include link structures 36 and 37 interposed between the forward ends of each traction frame 15 and the adjacent portion of the main frame 3. These link structures 36 and 37 are substantially identical except for the fact that they are lefts and rights, therefore corresponding parts of each of said structures are given corresponding reference characters. In the present example these link structures each include a link 38 arranged to lie normally in a substantially horizontal plane. One end of said link, herein the forward end thereof, is pivotally connected by a bolt 39 with a bearing member 40 supported upon the forward end of the traction frame 15 for that side of the tractor. The opposite end of each link 38 is desirably provided with a laterally elongated bearing member 41 journaled to rock upon a shaft 42 that is supported at its opposite ends in depending arms 44, 46 of a second link member 48.

The upper ends of the arms 44 and 46 are formed integral with an elongated bearing member 50 which is in turn journaled to rock upon a shaft 51 mounted horizontally and transversely of the main frame in bearings 52 and 53 suspended from brackets 54 secured respectively to the side members 4 of the main frame 3.

The shaft 51 as stated extends entirely across the main frame supporting the link members 48 of both link structures 36 and 37, but owing to the fact that the traction frames 15 are connected together by the yielding equalizing member 19 there may be times when both of said traction frames will move in the same direction for different distances. Therefore the shaft 42 for the link member 48 of the link structure 36 will be independent of the corresponding shaft of the other link structure 37, thereby permitting the arms 44 and 46 of one of said link members 48 to swing independently of the similar arms of the link member 48 of the other link structure.

These link structures are desirably placed beneath the main frame but high enough above the ground to prevent them from striking against rocks or other protuberances. Furthermore the forward ends of the links 38 and their corresponding supporting brackets 40 do not project beyond the equalizer member 19 so as to unnecessarily elongate the chassis of the vehicle.

From the foregoing description it will be obvious that the traction frames 15 will be permitted to rock in vertical planes, to occasionally yield slightly with respect to each other due to the yielding of the ends of the swing 19 and yet remain constantly in vertical parallel relation to each other, thus eliminating any spreading or drawing together of the endless track structures either during their straightaway movements or when the tractor is being turned in one direction or the other, all sliding joints and unnecessary friction between the moving parts being eliminated by the pivotal joints of the several links forming said link structures.

The long bearing members of the several links in addition to providing a laterally rigid structure will also greatly reduce the wear upon the movable parts of the link structures and assist materally in reinforcing the main frame and traction frame structures, and by reducing the wear on said several parts quiet operation of the relatively pivoted members will be assured for a long period of time.

For convenience the bearing member 40 constitutes an integral part of a bracket 55 which also carries the arm 35 for supporting the outer end of the equalizing member 19, said bracket 55 being securely bolted herein to the cross member 17 of the traction frame 15.

In the present embodiment of the invention means are provided in the form of abutments or cooperating stop members for limiting the relative vertical movements between the endless track structures or frames 15 and the main frame 3. Desirably these abutments are formed as shown at 56 and 57 respectively upon the links 38 and the frame 3, said abutments 56 being disposed at the proper angles to contact with the under side of the frame 3 which constitute the other abutments 57 when said links 38 are swung to their predetermined uppermost positions.

There may also be times when, due to overloading of the tractor or to the breaking of the leaves 20 of the equalizer spring 19, these abutments may be called upon to sustain the entire weight of the load of the main frame upon the tractor frames.

Although I have disclosed in detail one full and complete embodiment of my invention it is to be understood that the invention is not limited thereto.

Claims:

1. In a vehicle the combination with a main frame, of a vertically swinging endless track structure at each side of the main frame pivoted to swing about transverse horizontally disposed axes, link means connecting each of said track structures with said main frame for allowing said track structures to oscillate about said transverse axes in longitudinal parallel planes during the swinging vertical movements thereof and resilient means interposed between said track structures and said main frame.

2. In a vehicle the combination with a main frame, of a vertically swinging endless track structure at each side of the main frame, means to prevent lateral deviation of said track structures from longitudinal parallel planes during the vertical swinging movements thereof including fore and aft swinging links having laterally elongated transverse pivotal connections with the main frame and connections for said links with said track structures for permitting said vertical swinging movements of said track structures but preventing said lateral deviations thereof.

3. In a vehicle the combination with a main frame of a vertically movable endless track structure at each side of said main frame, yielding means for connecting said track structures with said main frame and means to maintain said track structures in uniformly spaced parallel relation throughout the vertical movements thereof, said means including links arranged longitudinally of said main frame and having laterally extended transverse pivotal connections with the main frame and traction frames and allowing vertical swinging movements of the forward ends of said track structures relative to said main frame.

4. A vehicle comprising in combination a main frame, vertically movable traction members at each side of said main frame, yielding means for connecting said traction members with said main frame, and means for guiding said traction members vertically including fore and aft links having broad transverse pivotal connections beneath said main frame and connections between said fore and aft links and said traction members for allowing movements of said traction members vertically relative to said main frame but preventing lateral movements of said traction members.

5. A vehicle comprising in combination a main structure, a traction member pivoted at each side of said main structure for swinging movements relative to said main structure in longitudinal parallel planes, and link means having transversely elongated pivotal connections with said main structure and pivotal connections with said traction members whereby said traction members are free to swing vertically in said longitudinal planes relative to said main structure but are prevented from movement laterally with respect to said main structure.

6. A vehicle comprising in combination a main structure, a traction member pivoted at each side of said main structure for movement vertically relative to said main structure, means for connecting the forward portions of said traction members with the forward portion of said main structure for the purpose of permitting vertical movements of said traction members relative to said main structure but preventing lateral movements between said members, said means including links with transversely elongated bearing members, depending supporting means on said main structure to which said links are pivoted, and pivotal connections between said links and said traction members arranged to describe an arc of a circle during the vertical movements of said traction members.

7. A vehicle comprising in combination a main frame, vertically movable traction members at each side of said main frame, yielding means for connecting said traction members with said main frame, and means for guiding said traction members vertically including fore and aft links having broad transverse pivotal connections beneath said main frame and connections between said fore and aft links and said traction members for allowing said traction members to swing vertically in planes longitudinally of said main frame and connecting links between said traction frames and said main frame to prevent lateral movements of said traction members.

8. A tractor comprising in combination, a main structure, a track laying structure pivotally connected to the rear of said main structure at each side thereof, a resilient, pivoted equalizer for equally distributing the weight of the forward end of said main structure upon said track laying structures, and a laterally rigid, vertically and longitudinally flexible system of connecting links supported beneath said main structure and connecting the latter and said track laying structures.

9. A tractor comprising in combination, a main structure, a track laying structure pivotally connected to the rear of said main structure at each side thereof, a resilient, pivoted equalizer for equally distributing the weight of the forward end of said main structure upon said track laying structures, a laterally rigid, vertically and longitudinally flexible link structure interposed between each of said track laying structures and said main structure, and means common to both of said link structures for connecting said link structures to said main frame structure.

10. A tractor comprising in combination, a main structure, a track laying structure pivotally connected to the rear of said main structure at each side thereof, a resilient, pivoted equalizer for equally distributing the weight of the forward end of said main structure upon said track laying structures, a laterally rigid, vertically and longitudinally flexible link structure interposed between each of said track laying structures and a shaft mounted beneath said main structure and arranged to pivotally connect both of said link structures to said main structure.

11. A tractor comprising in combination, a main structure, a track laying structure pivotally connected by transverse pivots to said main structure at each side thereof, a pivoted equalizing member for equally distributing the weight of said main structure upon said track laying structures, and a laterally rigid, vertically and longitudinally flexible system of connecting links between said main structure and said track-laying structures.

12. In a vehicle the combination with a main frame of an endless track structure pivoted at each side of said main frame to swing in vertical parallel planes about said transverse pivots, equalizing means interposed between said track laying structures and said main frame, and a system of links interposed between said track laying structures and said main frame arranged to guide said track laying structures in vertical and longitudinal oscillations about said transverse pivots.

In testimony whereof, I have signed my name to this specification.

FREDERICK O. SNOW, Jr.